Patented Apr. 4, 1939

2,153,531

UNITED STATES PATENT OFFICE 2,153,531

METALLIFEROUS AZO DYES

Werner Lange, Dessau-Ziebigk in Anhalt, Germany, assignor to General Aniline Works, Inc., New York, N. Y., a corporation of Delaware No Drawing. Application April 6, 1938, Serial No. 200,417. In Germany July 2, 1936

7 Claims. (Cl. 260—143)

My present invention relates to new azo dyes and more particularly to metalliferous disazo dyes.

It is a continuation-in-part of my copending application Ser. No. 150,325, filed June 25, 1937.

By the present invention dyes which are particularly suitable for dyeing chrome leather and vegetable tanned leather are made by coupling a 1-amino-8-hydroxynaphthalene sulfonic acid with a 1.3-dihydroxy compound of the benzene series capable of double coupling, causing an ortho-hydroxy-diazo compound to react with the monoazo dye thus obtained and then concerting this disazo dye into a metal compound. Suitable metals for making this compound are copper, iron, nickel, manganese, chromium, cobalt and aluminum. The order in which the coupling operations are performed may be conducted in the reverse way. Especially valuable on account of their color tone and their superior fastness to light are the metalliferous azo dyes obtained with use of 1.3-hydroxy-benzenes as component.

The dyes dye chrome leather and vegetable tanned leather beautiful red-brown to dark-brown level tints which are of especially good fastness to acids, alkalies and light.

As compared with the known metalliferous dyes of similar composition in which instead of the diazotized 1-amino-8-hydroxynaphthalene sulfonic acid other diazo compounds are used, the new dyes are distinguished by the improved fastness to light of their dyeings and their beautiful tints.

As compared with similarly composed dyes which are free from metal the new dyes are also distinguished by the improved fastness to light of their dyeings on leather.

The following examples illustrate the invention, the parts being by weight:—

*Example 1.*—34.1 parts of 1-amino-8-hydroxynaphthalene-3.6-disulfonic acid (acid sodium salt) are diazotized in known manner and coupled with a solution kept alkaline of 11 parts of 1.3-dihydroxybenzene. To this monoazo dye, also in a medium kept alkaline, there is added the diazo compound prepared from 15.4 parts of 4-nitro-2-amino-1-hydroxybenzene. When coupling is complete 22 parts of sodium carbonate are added and while heating to about 60° C. there is run in a solution of 25 parts of crystallized copper sulfate and the whole is heated at 80° C. until the color tint no longer changes. The dye is salted out from a neutral solution by means of common salt. It dyes chrome calf and vegetable tanned sheep skins even, clear, red-brown tints of excellent fastness to alkali, acid and light.

*Example 2.*—The disazo dye is prepared as described in Example 1, but instead of copper sulfate 50 parts of chrome alum are used and the heating operation is at 95 to 100° C. for one hour. The dye is separated as described in Example 1. It dyes various sorts of leather tints similar to those obtained in the product of Example 1 and of equally good fastness.

Instead of chromium or copper compounds there may be used with like effect other suitable metal salts, for instance, manganese, iron, nickel, cobalt or aluminum.

*Example 3.*—The dye produced according to Example 1 from 1-amino-8-hydroxynaphthalene-3.6-disulfonic acid, 1.3-dihydroxybenzene and 4-nitro-2-amino-1-hydroxybenzene, is treated for 2 hours to 95 to 100° C. in the presence of 21.7 parts of ferric chloride. This dye separated in the usual manner dyes chrome calf and vegetable tanned leather nigger-brown tints of excellent fastness.

*Example 4.*—34.1 parts of 1-amino-8-hydroxynaphthalene-4.6-disulfonic acid (acid sodium salt) are diazotized in the usual manner and coupled in an alkaline solution with 11 parts of 1.3-dihydroxybenzene. To this monoazo dye also in a medium kept alkaline, there is added the diazo compound prepared from 15.4 parts of 4-nitro-2-amino-1-hydroxybenzene. When coupling is complete, 44 parts of sodium carbonate are added and while heating to about 60° C. there is run a solution of 50 parts of crystallized copper sulfate and the whole is heated at 60° C. until the color tint no longer changes. The dye is separated in the known manner. It dyes chrome-calf leather red-brown tints of excellent fastness.

*Example 5.*—If in the foregoing example instead of 15.4 parts of 4-nitro-2-amino-1-hydroxybenzene 18.9 parts of 4-chloro-6-nitro-2-amino-1-hydroxybenzene are used as second azo component, a cupriferous dye is obtained dyeing leather somewhat bluer tints than that obtainable according to Example 1.

Instead of 1-amino-8-hydroxynaphthaline-3.6- or 4.6-disulfonic acid other peri-aminohydroxy-naphthalene sulfonic acids may be used with like effect, for instance, 1-amino-8-hydroxynaphthalene-4- or 5-sulfonic acid, 1-amino-8-hydroxynaphthalene-2.4- or -3.5-disulfonic acid; the 4-nitro-2-amino-1-hydroxybenzene as second component may be exchanged for another ortho-amino-hydroxybenzene or ortho-amino-hydroxynaphthalene, for example 2-amino-1-hydroxybenzene, 4.6-dinitro- or -dichloro-2-amino-1-hydroxybenzene, 4-chloro-2-amino-1-hydroxybenzene, 2-amino-5-nitro-1-hydroxybenzene, 6-chloro-2-amino-4-nitro-1-hydroxybenzene, 4-chloro-2-amino-6-nitro-1-hydroxybenzene, 4-chloro-2-amino-5-nitro-1-hydroxybenzene, 2-amino-1-hydroxybenzene-4-sulfonic acid, 1-methyl-3-amino-2-hydroxybenzene-5-sulfonic acid, 4-chloro-2-amino-1-hydroxybenzene-5-sulfonic acid, 4-chloro-2-amino-1-hydroxybenzene-6-sulfonic acid, 2-amino-6-nitro-1-hydroxybenzene-4-sulfonic acid, 2-amino-4-nitro-1-hydroxybenzene-6-sulfonic acid, 1-amino-2-hydroxynaphthalene, 1-amino-2-hydroxy-6-nitro-naphthalene-4-sulfonic acid, or 1-amino-2-hydroxynaphthalene-4-, -5-, or -6-monosulfonic acid.

In order to form the metalliferous complex compounds, other metal salts of the metals mentioned above, may be used. These processes for forming metal-containing dyes are well-known in the art.

What I claim is:

1. The metalliferous disazo dyes which correspond to the general formula

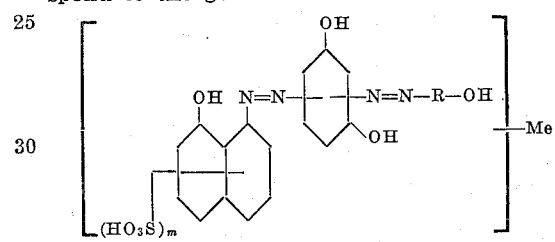

wherein R is a radicle of the group consisting of radicles of the benzene and naphthalene series in which the OH—group is in ortho-position to the azo bridge, $m$ is 1 or 2 and Me means a metal of the group consisting of chromium, copper, manganese, iron, nickel, cobalt and aluminum, said dyes dyeing chrome leather beautiful red-brown to dark-brown level tints of good fastness to acids, alkalies and light.

2. The metalliferous disazo dyes which correspond to the general formula

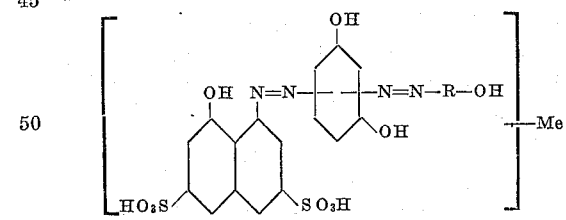

wherein R is a radicle of the group consisting of radicles of the benzene and naphthalene series in which the OH—group is in ortho-position to the azo bridge, and Me means a metal of the group consisting of chromium, copper, manganese, iron, nickel, cobalt and aluminum, said dyes dyeing chrome leather beautiful red-brown to dark-brown level tints of good fastness to acids, alkalies and light.

3. The metalliferous azo dyes which correspond to the general formula

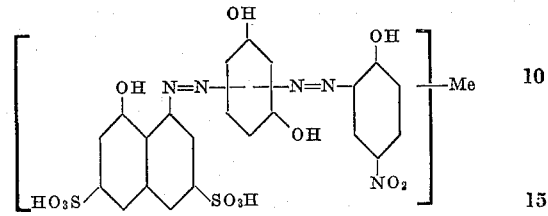

wherein Me means a heavy metal of the group consisting of chromium, copper, manganese, iron, nickel, cobalt and aluminum, said dyes dyeing chrome leather and vegetable tanned leather beautiful red-brown to dark-brown level tints of good fastness to acids, alkalies and light.

4. The process which comprises diazotizing a 1-amino-8-hydroxynaphthalene sulfonic acid, coupling the diazo compound with 1.3-dihydroxybenzene, diazotizing an amine of the group consisting of 1-hydroxy-2-aminobenzenes and 1-hydroxy-2-aminonaphthalenes, coupling this diazo compound with the dye previously formed and treating the disazo dye thus obtained with a metal compound of the group consisting of chromium, copper, manganese, iron, nickel, cobalt and aluminum salts.

5. The process which comprises diazotizing a 1-amino-8-hydroxynaphthalene-3.6-disulfonic acid, coupling the diazo compound with 1.3-dihydroxybenzene, diazotizing an amine of the group consisting of 1-hydroxy-2-aminobenzenes and 1-hydroxy-2-aminonaphthalenes, coupling this diazo compound with the dye previously formed and treating the disazo dye thus obtained with a metal compound of the group consisting of chromium, copper, manganese, iron, nickel, cobalt and aluminum salts.

6. The process which comprises diazotizing 1-amino-8-hydroxynaphthalene-3.6-disulfonic acid, coupling the diazo compound with 1.3-dihydroxynaphthalene, diazotizing 1-hydroxy-2-amino-4-nitrobenzene, coupling this diazo compound with the dye previously formed and treating the disazo dye thus formed with ferric chloride.

7. The process which comprises diazotizing 1-amino-8-hydroxynaphthalene-3.6-disulfonic acid, coupling the diazo compound with 1.3-dihydroxynaphthalene, diazotizing 1-hydroxy-2-amino-4-nitrobenzene, coupling this diazo compound with the dye previously formed and treating the disazo dye thus formed with copper sulfate.

WERNER LANGE.